(12) United States Patent
Nakamura

(10) Patent No.: US 7,352,561 B2
(45) Date of Patent: Apr. 1, 2008

(54) SURFACE-MOUNT SOLID ELECTROLYTIC CAPACITOR AND PROCESS FOR MANUFACTURING THE SAME

(75) Inventor: Takahiro Nakamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/450,206

(22) Filed: Jun. 9, 2006

(65) Prior Publication Data
US 2007/0002517 A1    Jan. 4, 2007

(30) Foreign Application Priority Data
Jun. 15, 2005    (JP) .............................. 2005-175584

(51) Int. Cl.
*H01G 9/00* (2006.01)
(52) U.S. Cl. ...................... 361/523; 361/525; 361/528; 361/529; 361/516; 361/519; 29/25.01; 29/25.03
(58) Field of Classification Search ................ 361/523, 361/525, 528–534, 516–519, 508–512; 29/25.01, 29/25.03
See application file for complete search history.

(56) References Cited

U.S. PATENT DOCUMENTS

| | | | | |
|---|---|---|---|---|
| 6,236,561 | B1 * | 5/2001 | Ogino et al. ................. | 361/523 |
| 6,249,424 | B1 * | 6/2001 | Nitoh et al. ................. | 361/523 |
| 6,467,142 | B1 * | 10/2002 | Shirashige et al. ........ | 29/25.42 |
| 6,614,063 | B2 * | 9/2003 | Hayashi et al. .............. | 257/213 |
| 6,751,086 | B2 | 6/2004 | Matsumoto | |
| 6,798,644 | B1 * | 9/2004 | Piller et al. .................. | 361/528 |
| 6,870,727 | B2 * | 3/2005 | Edson et al. ................. | 361/523 |
| 6,882,521 | B2 * | 4/2005 | Tsutsui et al. ............... | 361/523 |
| 6,903,921 | B2 * | 6/2005 | Ishijima ...................... | 361/523 |
| 6,972,943 | B2 * | 12/2005 | Kato et al. ................... | 361/533 |
| 7,139,164 | B2 * | 11/2006 | Horio et al. ................. | 361/540 |
| 7,227,739 | B2 * | 6/2007 | Kobayashi ................... | 361/523 |

FOREIGN PATENT DOCUMENTS

JP    2003-68576    3/2003

\* cited by examiner

*Primary Examiner*—Nguyen T. Ha
(74) *Attorney, Agent, or Firm*—Hamre, Schumann, Mueller & Larson, P.C.

(57) ABSTRACT

A solid electrolytic capacitor includes a capacitor element, an anode lead terminal, a cathode lead terminal and a resin package. The capacitor element includes an anode chip body, an anode bar projecting from the anode chip body, and a cathode film provided on a periphery of the anode chip body. Each of the lead terminals is embedded in a bottom portion of the package so that the lower surface of the lead terminal is exposed at a lower surface of the package. A stud resistance-welded to the anode bar of the capacitor element is fixed to the anode lead terminal. A welding support is provided at both an upper portion of the stud which is closer to the anode chip body and an upper portion of the stud which is farther from the anode chip body. The welding support comes into contact with the anode bar in resistance-welding the anode bar to the stud.

7 Claims, 6 Drawing Sheets

SURFACE-MOUNT SOLID ELECTROLYTIC CAPACITOR AND PROCESS FOR MANUFACTURING THE SAME

BACKGROUND OF THE INVENTION

1. Field of the Invention

The present invention relates to a solid electrolytic capacitor which includes a capacitor element hermetically sealed in a package made of synthetic resin. The present invention particularly relates to a surface-mount solid electrolytic capacitor to be mounted on a support member such as a printed circuit board by soldering, and to a method for manufacturing such a solid electrolytic capacitor.

2. Description of the Related Arts

Generally, a surface-mount solid electrolytic capacitor of the above-described type includes an anode lead terminal and a cathode lead terminal each projecting from a side surface of a package. With this structure, however, the size of the capacitor increases due to the projection of the two lead terminals from the side surfaces of the package, whereby the weight thereof also increases.

Figure 11:
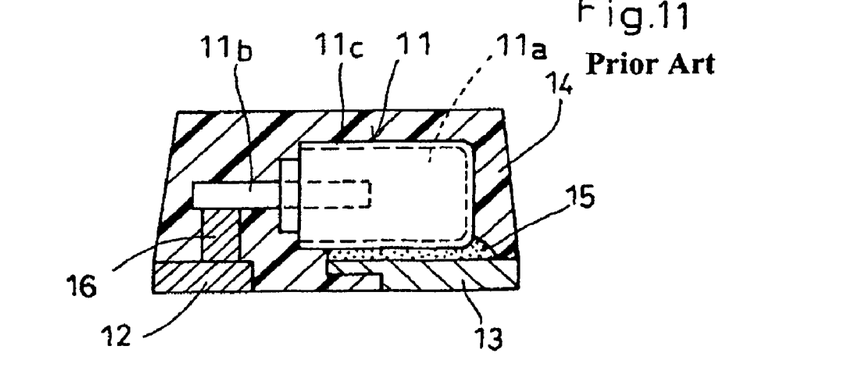
FIG. 11 is a sectional view showing a conventional solid electrolytic capacitor.

Recently, therefore, to reduce the size and weight of the capacitor, a surface-mount solid electrolytic capacitor is proposed which has such a structure as disclosed in JP-A-2003-67576. As shown in FIG. 11, the surface-mount solid electrolytic capacitor disclosed in the above-described publication includes a capacitor element 11, an anode lead terminal 12 and a cathode lead terminal 13 made of a metal plate, and a package 14 made of synthetic resin and hermetically sealing the entirety of the capacitor element 11. The lead terminals 12 and 13 are embedded in the bottom portion of the synthetic resin package 14 so that respective lower surfaces of the lead terminals 12 and 13 are exposed at the lower surface of the package 14. The capacitor element 11 is arranged on the upper side of the lead terminals 12 and 13. The capacitor element 11 includes a porous anode chip body 11a, and an anode bar 11b projecting laterally from the anode chip body. A stud 16 is integrally formed on the anode lead terminal 12, and the anode bar 11b is bonded to the upper surface of the stud 16 by welding. A cathode film 11c is formed on the periphery of the anode chip body 11a of the capacitor element 11, and the cathode film is bonded to the upper surface of the cathode lead terminal 13 by conductive paste 15.

In the capacitor element 11, the bonding of the anode bar 11b, which projects from the anode chip body 11a, to the upper surface of the stud 16 on the anode lead terminal 12 is performed by resistance welding described below.

Figure 12:
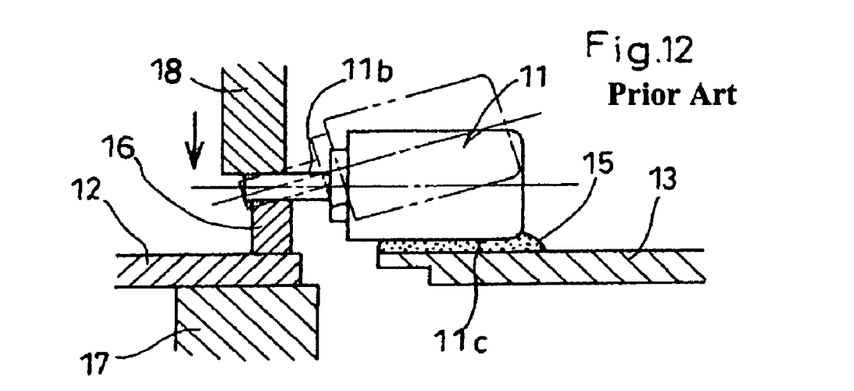
FIG. 12 shows a state in the resistance welding of a capacitor element in the process of manufacturing the conventional solid electrolytic capacitor.

First, as shown in FIG. 12, the cathode film 11c of the capacitor element 11 is bonded to the cathode lead terminal 13 by conductive paste 15. The anode lead terminal 12 is placed on a welding receive electrode 17. In this state, the anode bar 11b is pressed against the stud 16 by a welding press electrode 18. By flowing current between the welding receive electrode 17 and the welding press electrode 18, the anode bar 111b and the stud 16 are resistance-welded.

However, in the above-described resistance welding, the press electrode 18 (and/or the receive electrode 17) may deviate from the stud 16 in the axial direction of the capacitor element 11 (horizontal direction in FIG. 12). Specifically, the press electrode 18 may deviate in the direction away from the capacitor element 11 (See FIG. 12) or in the direction toward the capacitor element 11 (See FIG. 13).

In the instance shown in FIG. 12, the corner portion of the stud 16, which is farther from the capacitor element 11, melts first. In this state, the anode bar 11b is pressed downward by the press electrode 18. Therefore, a force in the counterclockwise direction is exerted on the anode bar 11b. As a result, as indicated by the double-dashed line in the figure, the capacitor element 11 rises from the cathode lead terminal 13, and the cathode film 11c bonded previously is separated from the cathode lead terminal 13.

Figure 13:
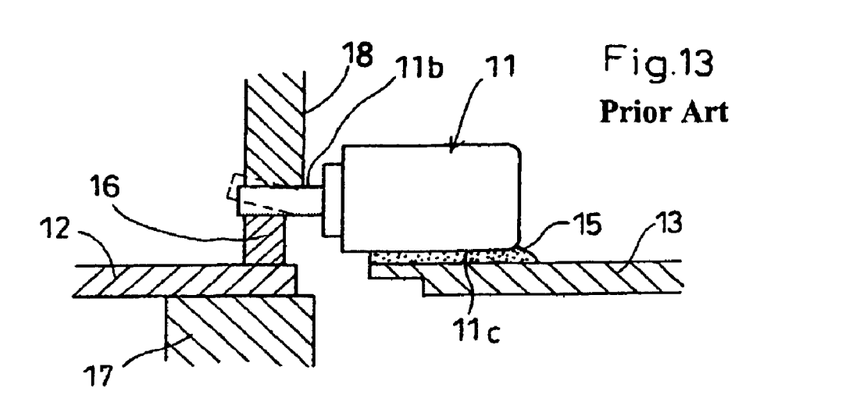
FIG. 13 shows another state in the conventional resistance welding.

In the instance shown in FIG. 13, the corner portion of the stud 16, which is closer to the capacitor element 11, melts first. In this state, the anode bar 11b is pressed downward by the press electrode 18. Therefore, a force in the clockwise direction is exerted on the anode bar 11b, so that the capacitor element 11 is excessively pressed against the cathode lead terminal 13. As a result, as indicated by the broken line in the figure, the left end of the anode bar 11b may be warped upward. In this case, dielectric breakdown occurs at the anode chip body 11a and/or the anode bar 11b.

DISCLOSURE OF THE INVENTION

The present invention is conceived under the circumstances described above. It is, therefore, an object of the present invention to provide a solid electrolytic capacitor having a structure capable of reducing the possibility of causing a defect in resistance welding. Another object of the present invention is to provide a process for manufacturing such a solid electrolytic capacitor.

According to a first aspect of the present invention, there is provided a surface-mount solid electrolytic capacitor comprising: a capacitor element including an anode chip body, an anode bar projecting from the anode chip body, and a cathode film formed on a periphery of the anode chip body; an anode lead terminal and a cathode lead terminal made of metal, the capacitor element being mounted on an upper side of the anode lead terminal and the cathode lead terminal; a package made of synthetic resin and hermetically sealing the capacitor element entirely; a stud fixed to the anode lead terminal and including an upper surface resistance-welded to the anode bar of the capacitor element; and a welding support provided at an upper portion of the stud, the support being provided at least on both a portion closer to the anode chip body and a portion farther from the anode chip body. Each of the lead terminals is embedded in a bottom portion of the package so that the lower surface of the lead terminal is exposed at a lower surface of the package. The cathode film of the capacitor element is fixed to an upper surface of the cathode lead terminal by conductive paste. The welding support is supported by at least one of the stud and the anode lead terminal. The welding support is so designed that the anode bar does not come close to the anode lead terminal during the resistance welding of the anode bar to the stud.

The welding support may be made of metallic or nonmetallic heat-resistant material having a melting point higher than the melting point of the stud.

Preferably, the welding support is so arranged that the upper surface thereof is positioned higher than the upper surface of the stud. For instance, the welding support may comprise a ring-shaped member fitted to the stud or plate-shaped members arranged at least two opposite portions of the stud.

According to a second aspect of the present invention, there is provided a process for manufacturing the above-described surface-mount solid electrolytic capacitor. The process includes the following steps. First, a capacitor element is placed on an upper side of an anode lead terminal and a cathode lead terminal which are made of metal and arranged side by side with a space therebetween. A cathode film provided on a periphery of an anode chip body of the capacitor element is fixedly connected to the cathode lead terminal. An anode bar projecting from the anode chip body is resistance-welded to an upper surface of a stud fixed to the anode lead terminal. Thereafter, the capacitor element is entirely sealed hermetically in a package made of synthetic resin so that respective lower surfaces of the anode lead terminal and the cathode lead terminal are exposed at a lower surface of the package. Further, according to the present invention, before the step of resistance-welding the anode bar to the stud, a welding support is provided, in advance, at both an upper portion of the stud which is closer to the anode chip body and an upper portion of the stud which is farther from the anode chip body. The welding support supports the anode bar so that the anode bar does not unduly come close to the anode lead terminal during the resistance welding. The welding support is supported by at least one of the stud and the anode lead terminal.

DETAILED DESCRIPTION OF THE PREFERRED EMBODIMENTS

Various embodiments of the present invention will be described below with reference to FIGS. 1-10.

FIGS. 1-4 show a surface-mount solid electrolytic capacitor according to a first embodiment of the present invention. The solid electrolytic capacitor includes a capacitor element 1, an anode lead terminal 2, a cathode lead terminal 3, a package 4 made of synthetic resin and hermetically sealing the entirety of the capacitor element 1.

Figure 1:
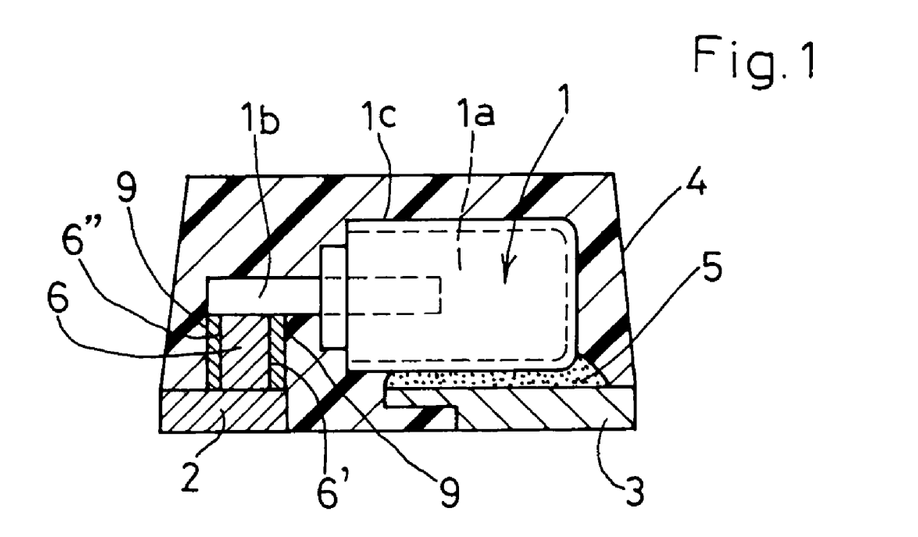
FIG. 1 is a sectional view showing a solid electrolytic capacitor according to a first embodiment of the present invention.

The capacitor element 1 includes an anode chip body 1a, an anode bar 1b and a cathode film 1c. The anode chip body 1a is formed by compacting powder of valve metal such as tantalum into a porous body and then sintering the porous body. The anode bar 1b is made of valve metal and projects from the anode chip body 1a. Though not illustrated in the figures, a dielectric film and a solid electrolytic layer are formed on a surface of the anode chip body 1a. The cathode film 1c is formed on the anode chip body 1a via the dielectric film and the solid electrolytic layer.

Figure 2:
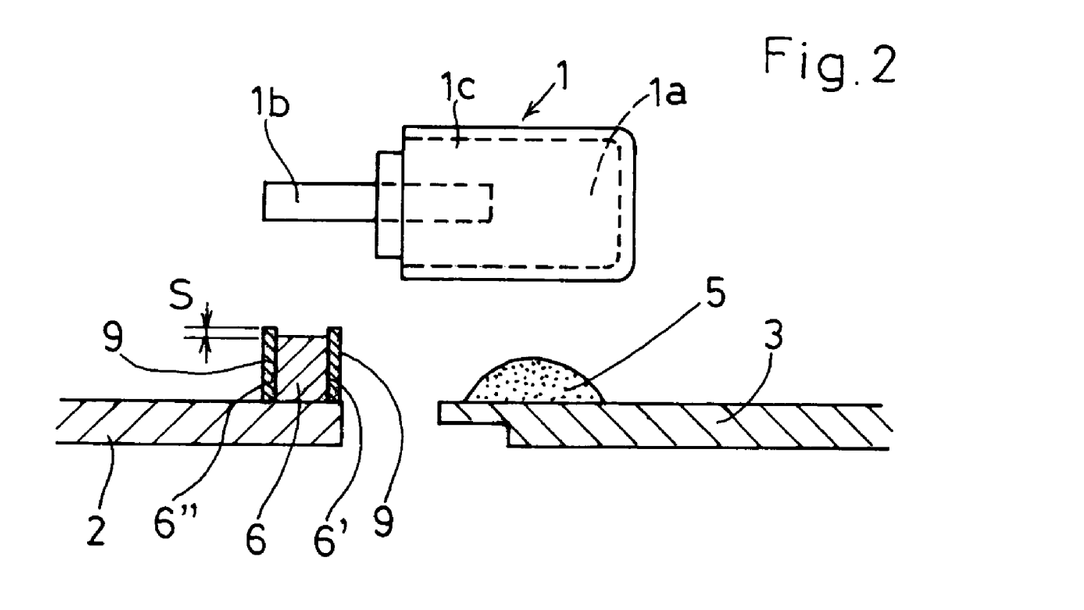
FIG. 2 shows a first step of a process for manufacturing the solid electrolytic capacitor.

As shown in FIG. 2, the anode lead terminal 2 and the cathode lead terminal 3 are horizontally spaced from each other by a predetermined distance. The anode lead terminal 2A has an upper surface to which a stud 6 having a predetermined shape is integrally bonded by welding, for example. The cathode lead terminal 3 has an upper surface to which conductive paste 5 is applied. The capacitor element 1 is provided on the upper surface side of the lead terminals.

Figure 3:
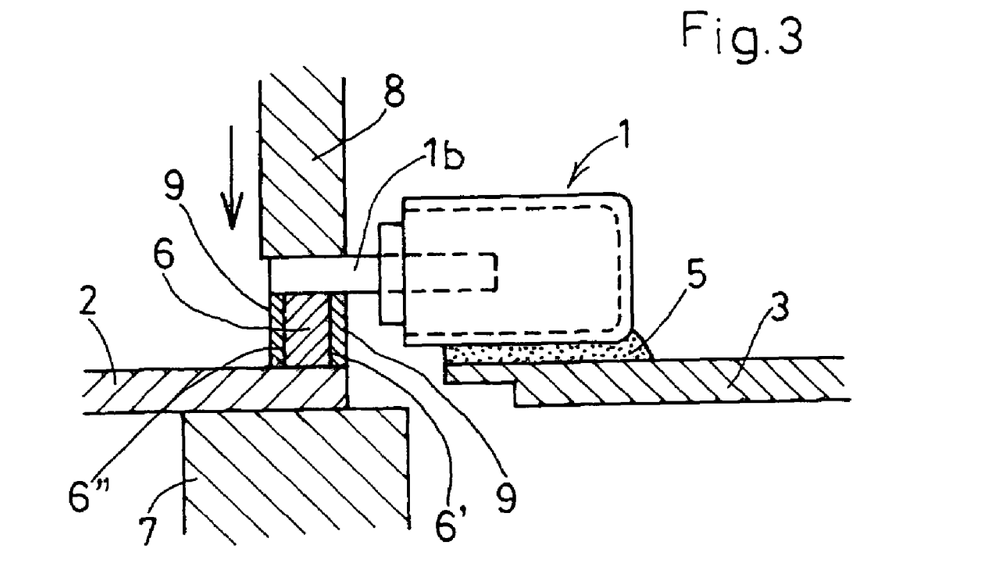
FIG. 3 shows a second step of the process for manufacturing the solid electrolytic capacitor.

As shown in FIG. 3, the cathode film 1c of the capacitor element 1 is fixed to the cathode lead terminal 3 by the conductive paste 5. The anode bar 1b is arranged on the stud 6. The anode bar 1b, the anode lead terminal 2 and the stud 6 are sandwiched by a welding receive electrode 7 and a welding press electrode 8. By flowing current between the two electrodes 7 and 8, the anode bar 1b is fixedly connected (resistance welding) to the stud 6.

As shown in FIG. 2, according to the present invention, before the resistance welding is performed, welding support 9 for holding the stud 6 is placed. For instance, the welding support 9 is made of a heat-resistant nonmetallic material (e.g. ceramic material) having a melting point higher than that of the stud 6. As will be described later, the welding support 9 may comprise a single ring-shaped member or a plurality of plate members.

The welding support 9 is provided on at least two portions of the stud 6, i.e., on a first side surface 6' which is relatively close to the anode chip body 1a and on a second side surface 6" which is opposite from the first side surface (relatively farther from the anode chip body 1a). As shown in FIG. 2, the support 9 includes a lower surface held in contact with and supported by the upper surface of the anode lead terminal 2 and an upper surface which is flush with or generally flush with the upper surface of the stud 6, for example. In this state, the above-described resistance welding is performed.

The above-described structure has the following advantages. In the resistance welding, when the press electrode 8 is deviated in the direction away from the capacitor element 1 (See FIG. 12 showing the conventional structure), the end of the anode bar 1b can be supported by the support 9 provided on the second side surface 6". Therefore, the anode bar 1b (and hence, the capacitor element 1) is reliably prevented from turning counterclockwise in FIG. 3. Further, in the resistance welding, when the press electrode 8 is deviated in the direction toward the capacitor element 1 (See FIG. 13 showing the conventional structure), the intermediate portion of the anode bar 1b can be supported by the support 9 provided on the first side surface 6'. Therefore, the capacitor element 1 is reliably prevented from being excessively pressed against the cathode lead terminal 3, and the anode bar 1b is reliably prevented from being deformed due to the pressing force of the press electrode 8.

According to the present invention, the anode bar 1b does not unduly come close to the anode lead terminal 2 during the resistance welding. Therefore, it is possible to effectively prevent the impairment of bonding between the cathode film 1c of the capacitor element 1 and the cathode lead terminal 3 and the dielectric breakdown at the capacitor element 1.

In the first embodiment described above, the upper surface of the welding support 9 is flush or generally flush with the upper surface of the stud 6. However, as shown in FIG. 2, the upper surface of the support 9 may be higher than the upper surface of the stud 6 by a small dimension S (the distance which allows the resistance welding of the anode bar 1b to the stud 6). With this structure, the anode bar 1b is more reliably prevented from being unduly pressed downward by the press electrode 8. In the present invention, the support 9 may be made of a material other than a heat-resistant nonmetallic material. For instance, the support 9 may be made of metal having a melting point higher than that of the stud 6.

Figure 4:
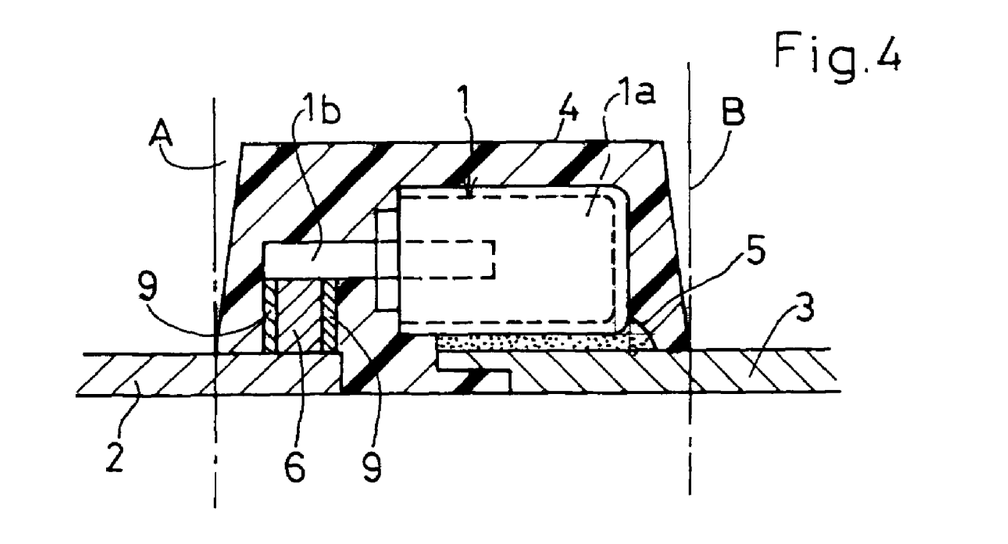
FIG. 4 shows a third step of the process for manufacturing the solid electrolytic capacitor.

As shown in FIG. 4, after the resistance welding of the anode bar 1b to the stud 6 is completed, the package 4 of synthetic resin is formed to hermetically seal the entirety of the capacitor element 1. Specifically, the package is formed by transfer-molding synthetic resin so that respective lower surfaces of the anode lead terminal 2 and the cathode lead terminal 3 are exposed at the lower surface of the package 4. Subsequently, portions of the anode lead terminal 2 and the cathode lead terminal 3 which project horizontally form the package 4 are cut along the cutting lines A and B. In this way, a complete solid electrolytic capacitor is obtained.

Figure 5:
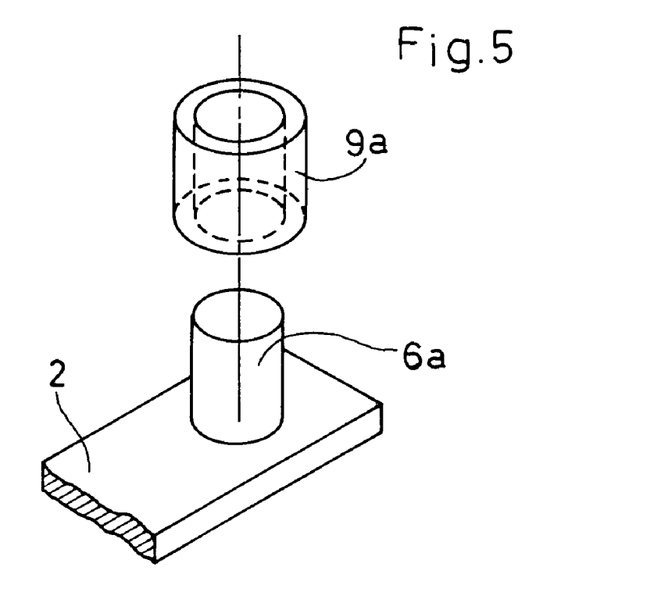
FIG. 5 is a perspective view showing a principal portion of a solid electrolytic capacitor according to a second embodiment of the present invention.

FIG. 5 is a perspective view showing a principal portion of a solid electrolytic capacitor according to a second embodiment of the present invention. The capacitor of the second embodiment is similar in overall structure to the capacitor of the first embodiment but characteristic in the structure of the stud and welding support, which will be described below.

In the second embodiment, the stud 6a is columnar, and a welding support 9a having a ring-shaped cross section is fitted to the stud 6a. For instance, the height of the welding support 9a (the dimension in the vertical direction in FIG. 5) is equal to or substantially equal to the height of the stud 6a. Alternatively, the height of the welding support 9a may be larger than that of the stud 6a by a predetermined amount (See reference sign S in FIG. 2).

According to the second embodiment, the holding of stud, which is to be connected to the anode bar, by the welding support can be realized by fitting the ring-shaped welding support 9a around the stud 6a. As will be easily understood, instead of the stud 6a which is circular in section, a stud having another cross section (e.g. rectangular section) may be used. In such a case, a welding support shaped to be properly fitted to the stud is used.

Figure 6:
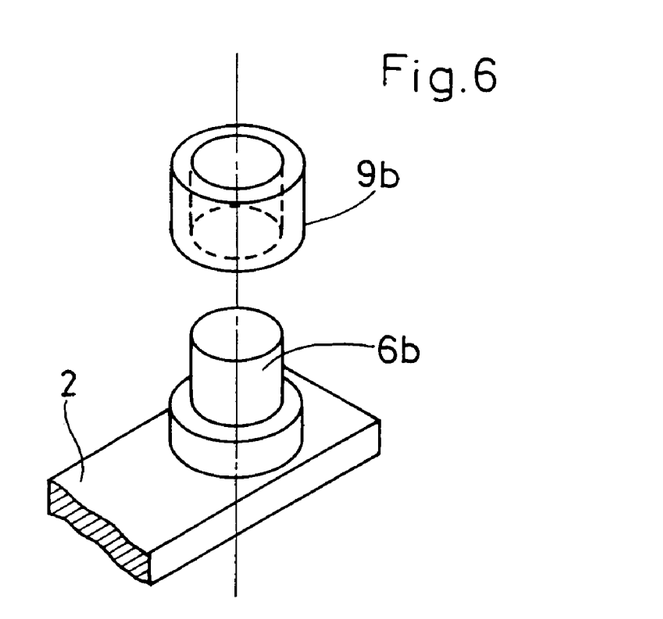
FIG. 6 is a perspective view showing a principal portion of a solid electrolytic capacitor according to a third embodiment of the present invention.

FIG. 6 is a perspective view showing a principal portion of a solid electrolytic capacitor according to a third embodiment of the present invention. Unlike the second embodiment, the stud 6b of the third embodiment comprises a base portion having a relatively large diameter and a fitting portion 6b having a diameter smaller than that of the base portion. The welding support 9b of the third embodiment is fitted around the fitting portion of the stud 6b and supported by the base portion in contact therewith. For instance, the height of the welding support 9b is equal to or substantially equal to the height of the fitting portion of the stud 6b. Alternatively, the height of the welding support 9b may be larger than that of the fitting portion of the stud 6b by a predetermined amount (See reference sign S in FIG. 2). For instance, the outer diameter of the welding support 9b may be equal to or substantially equal to the diameter of the stud 6b.

Figure 7:
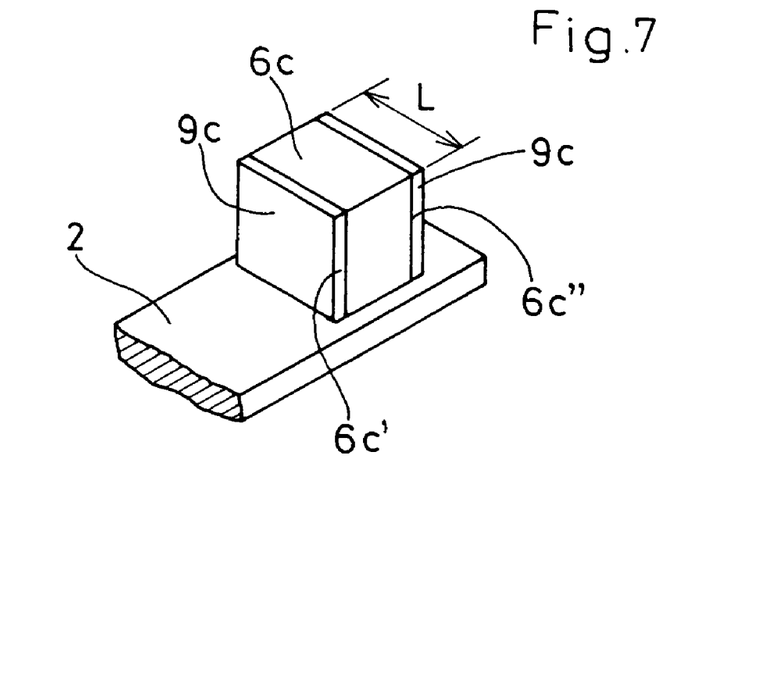
FIG. 7 is a perspective view showing a principal portion of a solid electrolytic capacitor according to a fourth embodiment of the present invention.

FIG. 7 is a perspective view showing a principal portion of a solid electrolytic capacitor according to a fourth embodiment of the present invention. In this embodiment, the stud 6c is in the form of a cube or a rectangular parallelepiped. The stud 6c has opposite side surfaces 6c' and 6c" to each of which a plate-shaped welding support 9c is bonded by heat-resistant adhesive or by cladding, for example.

The above-described stud/welding support assembly can be produced efficiently by the following method.

Figure 8:
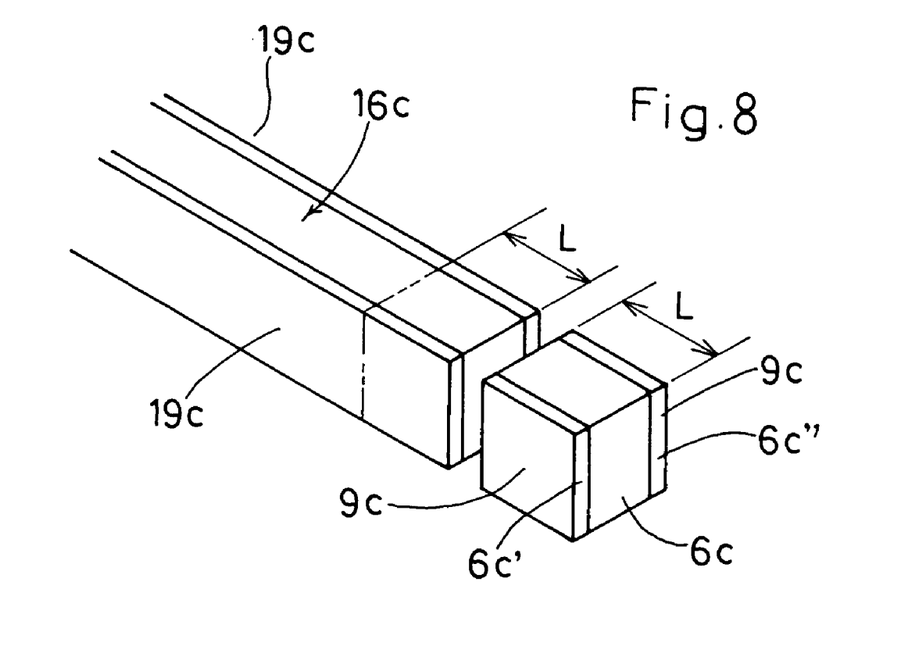
FIG. 8 is a perspective view showing a process for manufacturing the stud of the fourth embodiment.

As shown in FIG. 8, a metal bar 16c having a length capable of producing a plurality of studs 6c is prepared. A plate member 19c made of a heat-resistant nonmetallic material (such as ceramic material) or a heat-resistant metallic material is bonded to each of opposite side surfaces of the bar 16c by heat-resistant adhesive or by cladding, for example. Then, the elongate assembly is cut along cutting lines (See the double-dashed line) spaced at predetermined intervals L. Each of the stud/welding support assemblies obtained in this way is bonded to the anode lead terminal 2 by resistance welding, for example.

Figure 9:
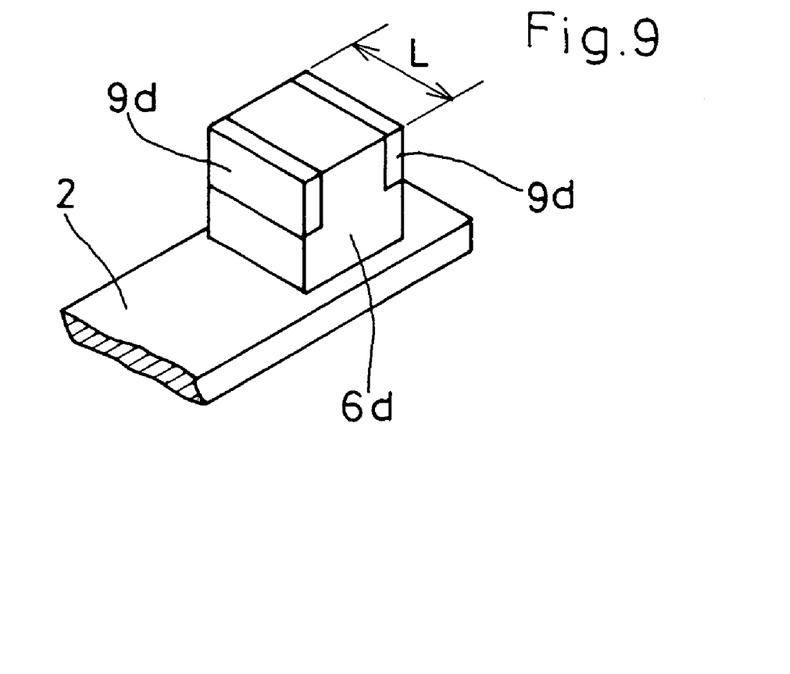
FIG. 9 is a perspective view showing a principal portion of a solid electrolytic capacitor according to a fifth embodiment of the present invention.

FIG. 9 is a perspective view showing a principal portion of a solid electrolytic capacitor according to a fifth embodiment of the present invention. As shown in the figure, the stud 6d in the fifth embodiment includes an upper portion formed with two cutouts at opposite positions. In each of the cutouts, a plate-shaped welding support 9d is arranged.

Figure 10:
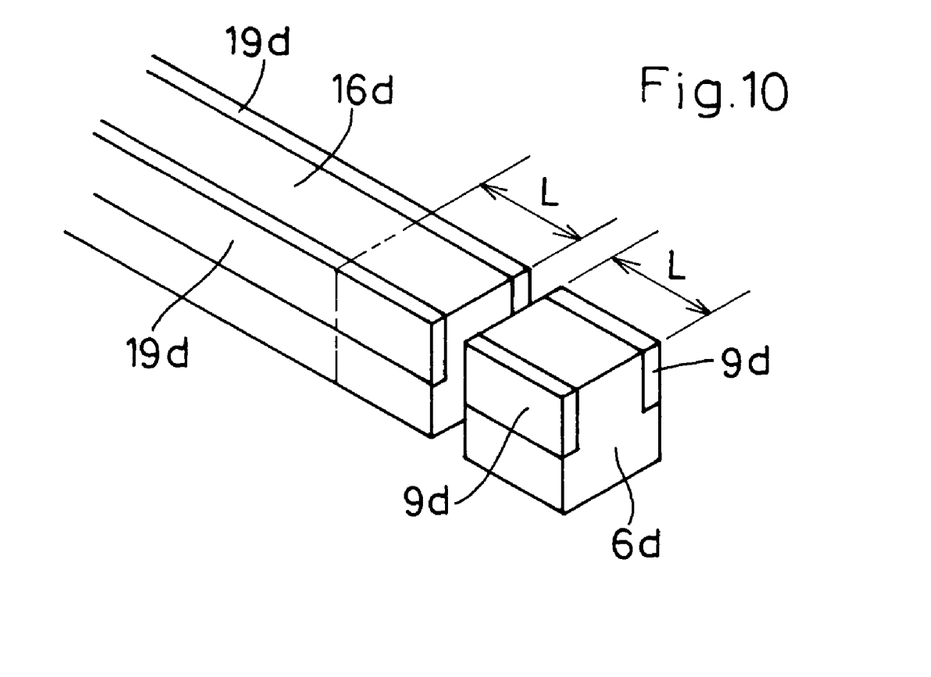
FIG. 10 is a perspective view showing a process for manufacturing the stud of the fifth embodiment.

In the fifth embodiment again, the stud/welding support assembly can be efficiently manufactured similarly to the fourth embodiment. Specifically, as shown in FIG. 10, a metal bar 16d having a length capable of producing a plurality of studs 6d is prepared. The metal bar 16d includes an upper portion formed with two cutouts at opposite positions. (Each of the cutouts extends in the longitudinal direction of the bar 16d) Subsequently, a plate member 19d made of a heat-resistant nonmetallic material (such as ceramic material) or a heat-resistant metallic material is bonded to each of the cutouts by heat-resistant adhesive or by cladding, for example. Finally, the elongate assembly is cut along cutting lines (See the double-dashed line) spaced at predetermined intervals L. Each of the stud/welding support assemblies obtained in this way is bonded to the anode lead terminal 2 by resistance welding, for example.

The invention claimed is:

1. A surface-mount solid electrolytic capacitor comprising:
   a capacitor element including an anode chip body, an anode bar projecting from the anode chip body, and a cathode film formed on a periphery of the anode chip body;
   an anode lead terminal and a cathode lead terminal made of metal, the capacitor element being mounted on an upper side of the anode lead terminal and the cathode lead terminal;
   a package made of synthetic resin and hermetically sealing the capacitor element entirely;
   a stud fixed to the anode lead terminal and including an upper surface resistance-welded to the anode bar of the capacitor element; and
   a welding support provided at an upper portion of the stud, the welding support being provided at least on both a portion closer to the anode chip body and a portion farther from the anode chip body;
   wherein each of the lead terminals is embedded in a bottom portion of the package so that a lower surface of the lead terminal is exposed at a lower surface of the package, and the cathode film of the capacitor element is fixed to an upper surface of the cathode lead terminal by conductive paste; and wherein the welding support is supported by at least one of the stud and the anode lead terminal and so designed that the anode bar does not come close to the anode lead terminal during the resistance welding of the anode bar to the stud.

2. The capacitor according to claim 1, wherein the welding support is made of metal having a melting point higher than a melting point of the stud.

3. The capacitor according to claim 1, wherein the welding support is made of heat-resistant non-metallic material having a melting point higher than a melting point of the stud.

4. The capacitor according to claim 1, wherein the welding support includes an upper surface which is positioned higher than an upper surface of the stud.

5. The capacitor according to claim 1, wherein the welding support comprises a ring-shaped member fitted to the stud.

6. The capacitor according to claim 1, wherein the welding support comprises two plate-shaped members bonded to opposite side surfaces of the stud.

7. A process for manufacturing a surface-mount solid electrolytic capacitor, the process comprising the steps of:

placing a capacitor element on an upper side of an anode lead terminal and a cathode lead terminal which are made of metal and arranged side by side with a space therebetween;

fixedly connecting a cathode film provided on a periphery of an anode chip body of the capacitor element to the cathode lead terminal;

resistance-welding an anode bar projecting from the anode chip body to an upper surface of a stud fixed to the anode lead terminal; and hermetically sealing the capacitor element entirely in a package made of synthetic resin so that respective lower surfaces of the anode lead terminal and the cathode lead terminal are exposed at a lower surface of the package;

wherein the process further comprises the step of:

providing a welding support for supporting the anode bar prior to resistance-welding of the anode bar to the stud, so that the anode bar does not unduly come close to the anode lead terminal during the resistance welding, the welding support being provided at both an upper portion of the stud which is closer to the anode chip body and an upper portion of the stud which is farther from the anode chip body so that the welding support is supported by at least one of the stud and the anode lead terminal.

* * * * *